Figures 1, 2:
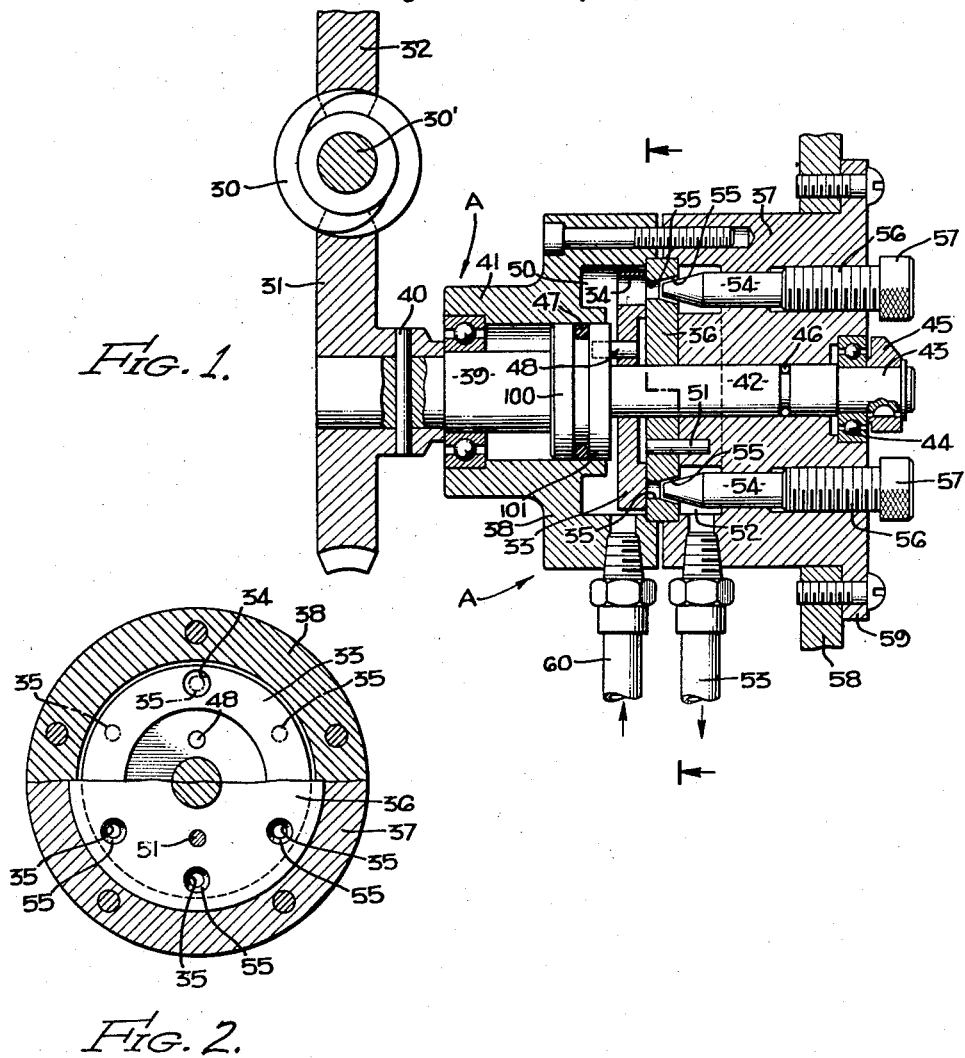

Nov. 10, 1959  F. G. BURG  2,912,011

VALVE STRUCTURE

Original Filed May 11, 1953

FRED G. BURG,
INVENTOR.

BY Flam and Flam

ATTORNEY 2,912,011

VALVE STRUCTURE

Fred G. Burg, Los Angeles, Calif.

Original application May 11, 1953, Serial No. 354,349, now Patent No. 2,776,584, dated January 8, 1957. Divided and this application August 2, 1956, Serial No. 603,207

1 Claim. (Cl. 137—625.3)

This invention relates to valves, and particularly such valves as are adapted to be used for regulating the volume of liquid in a step-by-step manner.

This application is a division of an application filed in the name of Fred G. Burg, on May 11, 1953, under Serial No. 354,349, entitled "Feed Control System for Machine Tools," and which has since matured into Patent No. 2,776,584.

It is one of the objects of this invention to provide a valve of this character which is simple in operation and inexpensive to manufacture.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claim.

Referring to the drawings:

Figure 1 is a longitudinal sectional view of a valve structure incorporating the invention; and Fig. 2 is a sectional view taken along a plane corresponding to line 2—2 of Fig. 1.

The valve structure A includes body 37 and a cover 38. Between these two elements is clamped the ported plate 36.

A worm wheel 31 is coupled to the shaft 39 as by a pin 40. This wheel is adapted to be driven by a worm 30, intermittently operative to provide a step-by-step motion to valve shaft 39. The worm 30 may also serve to drive other elements of a mechanism disclosed in said parent application, as by the aid of a worm wheel 32.

Shaft 39 is journalled in the hub 41 performed integrally with the cover member 38. The shaft 39 has a reduced extension 42 and an end extension 43. This end extension 43 serves to support the inner race of a ball bearing structure 44, mounted in body 37. This extension 43 carries a pointer 45 indicating the specific angular adjusted position of the shaft 39.

Sealing O-rings 46 and 47 are provided on the shaft 39. The latter ring 47 is accommodated between the two spaced flanges 100, 101 on shaft 39.

The shaft 39 is coupled to the valve plate 33 by the aid of a pin 48 fastened into flange 101, and which has an axis spaced from the axis of wheel 31.

Liquid or other fluid such as oil at high pressure is supplied to a chamber 50 formed by the aid of the cover member 38 and the plate 36. The pressure of this liquid serves to hold the plate 33 against the corresponding surface of the plate 36 in a fluid-tight manner. If necessary the cooperating surfaces may be appropriately ground or lapped.

Ported stationary plate 36 is restrained against angular movement not only by the clamping between body 37 and cover 38, but also by the aid of a pin 51.

Each of the ports 35 leads to an annular chamber 52, formed by the aid of the plate 36 and the body 37. An outlet conduit 53 is in fluid communication with this annular chamber 52. An inlet conduit 60 communicates with chamber 50.

In order to regulate the rate in a continuous manner at which liquid can flow from the chamber 50 to chamber 52, use is made of adjustable needle valve closures 54. There are six such closures, cooperating respectively with the ports 35. These ports 35 each are provided with the diverging conical portion 55 cooperating with the conical end of the needle valve members 54. Each of the needle valve members 54 is provided with a threaded portion 56 adjustably threaded into the body member 37 and manipulable as by the aid of knurled heads 57.

Obviously, by appropriate adjustment of the stems 54, the rate of fluid flow for each position of the head 3 is determined, in a stepless manner.

The body 37 is supported upon an appropriate support 58 as by the aid of the flange 59.

In operation, the worm 30 driven by shaft 30' angularly rotates the shaft 42 and by the aid of the pin coupling 48 it angularly advances the valve plate 33. Accordingly, the port 34 is brought successively into register with any one of the ports 35.

The valve mechanism A is compact and readily sealable as by seals 46 and 47. There is accordingly no danger of any material leakage, even if air instead of oil be used in the system.

The inventor claims:

In a valve structure: means forming a valve casing having an inlet port and an outlet port; a wall in the casing defining an inlet chamber and a single outlet chamber with which said inlet and outlet ports respectively communicate; said wall extending entirely across the interior of said casing, and having a series of spaced ports leading between the chambers; a movable valve plate overlying said wall and having a single opening therein; means for moving said plate intermittently to cause said opening to register in succession with selected ones of said spaced ports; each of said spaced ports having a tapered portion; a flow restrictor for each port having a portion extending into the tapered portion of its respective port for regulating the rate of fluid flow through said respective port; and means for individually adjusting each of the flow restrictors to a selected definite position within its respective port, to determine definite adjusted areas of the passageways through the ports; said restrictors each having a portion exterior of the casing, for facilitating their adjustments.

References Cited in the file of this patent

UNITED STATES PATENTS

| | | |
|---|---|---|
| 934,932 | Osbourn | Sept. 21, 1909 |
| 1,805,056 | Taylor | May 12, 1931 |
| 1,924,886 | Semon | Aug. 29, 1933 |
| 2,093,692 | Daniels | Sept. 21, 1937 |
| 2,150,077 | Oehler | Mar. 7, 1939 |
| 2,377,473 | Wolcott | June 5, 1945 |
| 2,510,356 | Werts | June 6, 1950 |
| 2,649,113 | Cizek | Aug. 18, 1953 |
| 2,653,625 | Peltz et al. | Sept. 29, 1953 |

FOREIGN PATENTS

| | | |
|---|---|---|
| 554,311 | Great Britain | June 2, 1943 |